US012456451B2

(12) United States Patent
Pan

(10) Patent No.: US 12,456,451 B2
(45) Date of Patent: Oct. 28, 2025

(54) SPEECH SYNTHESIS METHOD, APPARATUS, READABLE MEDIUM, AND ELECTRONIC DEVICE

(71) Applicant: BEIJING YOUZHUJU NETWORK TECHNOLOGY CO., LTD., Beijing (CN)

(72) Inventor: Junjie Pan, Beijing (CN)

(73) Assignee: BEIJING YOUZHUJU NETWORK TECHNOLOGY CO., LTD., Beijing (CN)

(*) Notice: Subject to any disclaimer, the term of this patent is extended or adjusted under 35 U.S.C. 154(b) by 366 days.

(21) Appl. No.: 18/017,570

(22) PCT Filed: Oct. 25, 2021

(86) PCT No.: PCT/CN2021/126146
§ 371 (c)(1),
(2) Date: Jan. 23, 2023

(87) PCT Pub. No.: WO2022/105545
PCT Pub. Date: May 27, 2022

(65) Prior Publication Data
US 2023/0298562 A1 Sep. 21, 2023

(30) Foreign Application Priority Data
Nov. 20, 2020 (CN) .......................... 202011312059.6

(51) Int. Cl.
G10L 13/08 (2013.01)
G06F 40/30 (2020.01)
G10L 13/047 (2013.01)
(52) U.S. Cl.
CPC .............. *G10L 13/08* (2013.01); *G06F 40/30* (2020.01); *G10L 13/047* (2013.01)

(58) Field of Classification Search
CPC ....... G10L 13/08; G10L 13/047; G10L 13/02; G10L 13/027; G06F 40/30; G06F 40/289
See application file for complete search history.

(56) References Cited

U.S. PATENT DOCUMENTS 10,475,438 B1 * 11/2019 Chicote ................ G10L 13/033
2003/0014252 A1 1/2003 Shizuka et al.
(Continued)

FOREIGN PATENT DOCUMENTS

CN 106601228 A 4/2017
CN 110288973 A 9/2019
(Continued)

OTHER PUBLICATIONS

International Patent Application No. PCT/CN2021/126146; Int'l Search Report; dated Jan. 29, 2022; 3 pages.
(Continued)

Primary Examiner — Linda Wong
(74) Attorney, Agent, or Firm — BakerHostetler

(57) ABSTRACT

This disclosure relates to a speech synthesis method, an apparatus, a readable medium, and an electronic device, and the method includes: acquiring target text corresponding to each sentence in a plurality of sentences included in text to be synthesized; for the each sentence, inputting the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to a previous sentence of the sentence in the text to be synthesized, and the historical audio is target audio corresponding to the historical text; and
(Continued)

synthesizing target audio corresponding to respective sentences to obtain total audio corresponding to the text to be synthesized.

20 Claims, 6 Drawing Sheets

(56) References Cited

U.S. PATENT DOCUMENTS

| | | | |
|---|---|---|---|
| 2016/0329043 A1 | 11/2016 | Kim et al. | |
| 2019/0088252 A1 | 3/2019 | Yoshida et al. | |

FOREIGN PATENT DOCUMENTS

| | | | |
|---|---|---|---|
| CN | 110299131 A | 10/2019 | |
| CN | 110675853 A | 1/2020 | |
| CN | 111128121 A | 5/2020 | |
| CN | 111177542 A | 5/2020 | |
| CN | 111274807 A | 6/2020 | |
| CN | 111292715 A | 6/2020 | |
| CN | 111292717 A | 6/2020 | |
| CN | 111292720 A | 6/2020 | |
| CN | 111341293 A | 6/2020 | |
| CN | 111341294 A | 6/2020 | |
| CN | 111583903 A | 8/2020 | |
| CN | 111583930 A | 8/2020 | |
| CN | 111627418 A | 9/2020 | |
| CN | 111899716 A | 11/2020 | |
| CN | 112489620 A | 3/2021 | |
| CN | 112489621 A | 3/2021 | |
| WO | WO 2019/222591 A1 | 11/2019 | |

OTHER PUBLICATIONS

Xiang Yin; "Research on Neural Network-based Acoustic Modeling for Speech Synthesis"; University of Science and Technology of China; Dissertation; May 2016; 139 pages (English Abstract on pp. 7-9).

Gao Yingying et al.; Describing and Detecting Affective Messages for Expressive Speech Synthesis; China Academic Journal Electronic Publishing House; NCMMSC; Oct. 2015; 6 pages (English Abstract on p. 6).

Valentini-Botinhao et al.; "Examplar-Based Speech Waveform Generation for Text-To-Speech"; IEEE Spoken Language Technology; 2018; p. 332-338.

* cited by examiner

SPEECH SYNTHESIS METHOD, APPARATUS, READABLE MEDIUM, AND ELECTRONIC DEVICE

CROSS-REFERENCE TO RELATED APPLICATIONS

This application is a U.S. National Stage under 35 U.S.C. § 371 of International Application No. PCT/CN2021/126146, as filed on Oct. 25, 2021, which is based on and claims the priority to the Chinese patent application No. 202011312059.6 filed on Nov. 20, 2020. The disclosure of each of these applications is hereby incorporated in its entirety into the present application.

TECHNICAL FIELD

This disclosure relates to a technical field of electronic information processing, and in particular, to a speech synthesis method, an apparatus, a readable medium, and an electronic device.

BACKGROUND

With continuous development of electronic information processing technology, speech, as an important carrier for people to acquire information, has been widely used in daily life and work. In an application scene where speech is involved, processing of speech synthesis is generally included, the speech synthesis referring to synthesizing text specified by a user into audio. In general, considering limited processing resources of a terminal device and stability of an output result, when the speech synthesis on the text is performed, the speech synthesis is separately performed on each sentence in the text, and then synthesized audio of respective sentences is spliced to obtain complete audio corresponding to the text, and, there may be a problem of great difference in an attribute such as style, volume, or the like among the audio corresponding to different sentences in the same text, resulting in poor consistency of the complete audio, so that auditory experience of the user is reduced.

SUMMARY

The section "SUMMARY" is provided to introduce concepts in a simplified form, which will be described in detail below in the following section "DETAILED DESCRIPTION". The section "SUMMARY" is not intended to identify key features or essential features of the claimed technical solutions, nor is it intended to limit the scope of the claimed technical solutions.

In a first aspect, the present disclosure provides a speech synthesis method, comprising:
  acquiring target text corresponding to each sentence in a plurality of sentences included in text to be synthesized;
  for the each sentence, inputting the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to an associated sentence of the sentence in the text to be synthesized, and the historical audio is target audio corresponding to the historical text; and
  synthesizing target audio corresponding to respective sentences to obtain total audio corresponding to the text to be synthesized.

In a second aspect, the present disclosure provides a speech synthesis apparatus, comprising:
  an acquisition module configured to acquire target text corresponding to each sentence in a plurality of sentences included in text to be synthesized;
  a first synthesis module configured to, for the each sentence, input the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to an associated sentence of the sentence in the text to be synthesized, and the historical audio is target audio corresponding to the historical text; and
  a second synthesis module configured to synthesize target audio corresponding to respective sentences to obtain total audio corresponding to the text to be synthesized In a third aspect, the present disclosure provides a computer-readable medium having thereon stored a computer program which, when executed by a processing device, implements the steps of the method according to the first aspect of the present disclosure.

In a fourth aspect, the present disclosure provides an electronic device, comprising:
  a storage device having thereon stored a computer program; and
  a processing device configured to execute the computer program in the storage device to implement the steps of the method according to the first aspect of the present disclosure.

In a fifth aspect, the present disclosure provides a computer program product comprising instructions which, when executed by a computer, enable the computer to implement the steps of the method according to the first aspect.

Through the above technical solutions, in the present disclosure, first, the target text corresponding to each sentence in the plurality of sentences included in text to be synthesized is acquired, then, for the each sentence, the target text corresponding to the sentence and the historical text and historical audio corresponding to the sentence are input into the pre-trained speech synthesis model, the output of which is the target audio corresponding to the sentence, wherein the historical text is the target text corresponding to the associated sentence of the sentence in the text to be synthesized, and the historical audio is the target audio corresponding to the historical text, and finally, the target audio corresponding to respective sentences is synthesized to obtain the total audio corresponding to the text to be synthesized. In the present disclosure, when the speech synthesis is performed on the text containing a plurality of sentences, for each sentence, the corresponding audio can be synthesized in combination with the information contained in the associated sentence of the sentence, so that audio corresponding to two adjacent sentences can be kept consistent, thereby improving the consistency of the total audio corresponding to the text.

Other feature and advantages of the present disclosure will be described in detail below in the following section "DETAILED DESCRIPTION".

BRIEF DESCRIPTION OF THE DRAWINGS

The above and other features, advantages, and aspects of embodiments of the present disclosure will become more apparent in combination with the accompanying drawings and with reference to the following detailed description. Throughout the drawings, identical or similar reference numbers refer to identical or similar elements. It should be understood that the drawings are schematic and that components and elements are not necessarily drawn to scale. In the drawings.

DETAILED DESCRIPTION

Figure 1:
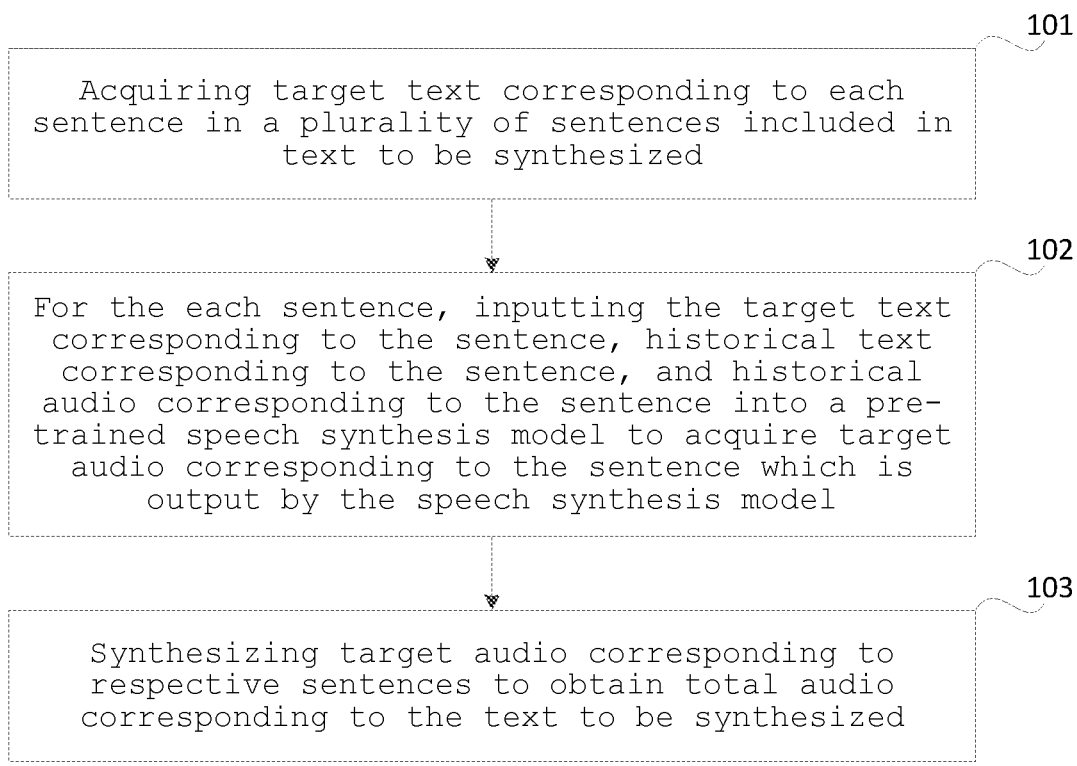
FIG. 1 is a flow diagram illustrating a speech synthesis method in accordance with an exemplary embodiment.

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein, but these embodiments are provided for a more complete and thorough understanding of the present disclosure. It should be understood that the drawings and the embodiments of the present disclosure are for exemplary purposes only and are not intended to limit the scope of the present disclosure.

It should be understood that various steps recited in method embodiments of the present disclosure can be performed in a different order, and/or performed in parallel. Moreover, the method embodiments can include additional steps and/or omit performing the illustrated steps. The scope of the present disclosure is not limited in this respect.

The term "comprising" and its variations used herein is intended to be open-minded, i.e., "comprising but not limited to". The term "based on" is "based at least in part on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts of "first", "second", and the like mentioned in the present disclosure are only used for distinguishing different devices, modules or units, and are not used for limiting the order or interdependence of functions performed by the devices, modules or units.

It should be noted that the modification of "one" and "more" in the present disclosure are intended to be illustrative rather than restrictive, and that those skilled in the art should appreciate that they should be understood as "one or more" unless otherwise clearly indicated in the context.

Names for messages or information exchanged between multiple devices in the embodiments of the present disclosure are for illustrative purposes only, and are not intended to limit the scope of the messages or information.

FIG. 1 is a flow diagram illustrating a speech synthesis method in accordance with an exemplary embodiment, and as shown in FIG. 1, the method comprises:

step 101, acquiring target text corresponding to each sentence in a plurality of sentences included in text to be synthesized.

For example, the text to be synthesized that needs to be synthesized is acquired first, in which target text corresponding to each sentence in the plurality of sentences is included. The text to be synthesized can be, for example, text corresponding to one or more paragraphs in a text file specified by a user, and accordingly, target text is text corresponding to each sentence in the paragraph. The text to be synthesized can also be text corresponding to one or more chapters in one text file, or text included in the entire text file. The text file can be, for example, one e-book, or another type of file, such as news, an official account article, a blog, or the like. Then, the text to be synthesized can be divided in accordance with a preset rule to obtain the target text corresponding to each sentence included in the text.

Step 102, for the each sentence, inputting the target text corresponding to the sentence, historical text corresponding to the sentence, and historical audio corresponding to the sentence into a pre-trained speech synthesis model, to acquire target audio corresponding to the sentence which is output by the speech synthesis model. The historical text can be text associated with the target text in the text to be synthesized, and in some embodiments, the historical text is target text corresponding to an associated sentence of the sentence in the text to be synthesized, specifically, the associated sentence is, for example, a previous sentence of the sentence in the text to be synthesized, and the historical audio is target audio corresponding to the historical text.

Exemplarily, one speech synthesis model can be pre-trained, which can be understood as one TTS (Text To Speech) model capable of generating, in accordance with text A, text B, and audio B corresponding to the text B, target audio corresponding to the text A. The text B is text having an association with the text A, and the association can be understood as there being an association between a sentence corresponding to the text B and a sentence corresponding to the text A, for example, consistency in dimensions such as volume, style, and emotion. For example, the text B can be in the same text as the text A, the text B can also be text adjacent to the text A in the same text, and the text B can also be previous text of the text A in the same text. Accordingly, the audio B is target audio corresponding to the text B, which is generated by the speech synthesis model when processing the text B, text C, and audio C corresponding to the text C. Similarly, the text C is text having an association with the text B, and the audio C is target audio corresponding to the text C. Specifically, the speech synthesis model can be obtained by training based on a Tacotron model, a Deepvoice 3 model, a Tacotron 2 model, a Wavenet model, or the like, which is not specifically limited in this disclosure.

After the text to be synthesized is divided into the target text corresponding to the plurality of sentences, for each sentence, the target text corresponding to the sentence, the historical text corresponding to the sentence, and the historical audio corresponding to the sentence can be input into the pre-trained speech synthesis model to acquire the target audio corresponding to the sentence which is output by the speech synthesis model. The historical text is the target text corresponding to an associated sentence of the sentence in the text to be synthesized, and the historical audio is the target audio corresponding to the historical text. The historical audio can be understood as audio output by the speech synthesis model when the historical text, associated text of the historical text in the text to be synthesized, and target audio corresponding to the associated text of the historical text in the text to be synthesized are used as inputs of the speech synthesis model, and specifically, the associated text of the historical text in the text to be synthesized can be, for example, previous text of the historical text in the text to be synthesized.

Step 103, synthesizing target audio corresponding to respective sentences to obtain total audio corresponding to the text to be synthesized.

Exemplarily, after the target audio corresponding to respective sentences is obtained, the target audio corresponding to respective sentences can be synthesized to obtain the total audio corresponding to the text to be synthesized. Each sentence corresponds to a piece of target audio (the target audio can include one or more audio frames), and the multiple pieces of target audio are spliced in accordance with a sequence of the target text corresponding to the each sentence in the text to be synthesized, to obtain a piece of total audio, which is the total audio. In this way, in the process of performing speech synthesis on the target text corresponding to the each sentence included in the text to be synthesized, besides the target text corresponding to the sentence, the historical text having an association with the sentence and the corresponding historical audio are also considered, so that the target audio and the historical audio can be kept consistent, which avoids problems such as a sudden volume change, style inconsistency, and the like between audio corresponding to different sentences in the same text. Because the audio corresponding to respective sentences in the text to be synthesized can be kept consistent as a whole, the consistency of the total audio is improved, and the auditory experience of the user is also improved.

In summary, in the present disclosure, first, the target text corresponding to each sentence in the plurality of sentences included in the text to be synthesized is acquired; and then, for the each sentence, the sentence and the historical text and historical audio corresponding to the sentence are input together into the pre-trained speech synthesis model, and the output of the speech synthesis model is the target audio corresponding to the sentence, wherein the historical text is target text corresponding to an associated sentence (for example, a previous sentence) of the sentence in the text to be synthesized, and the historical audio is target audio corresponding to the historical text; and finally, the target audio corresponding to respective sentences is synthesized to obtain the total audio corresponding to the text to be synthesized. In the present disclosure, when the speech synthesis is performed on the text including a plurality of sentences, for each sentence, the corresponding audio can be synthesized in combination with the information contained in the associated sentence of the sentence, so that audio corresponding to two adjacent sentences can be kept consistent, thereby improving the consistency of the total audio corresponding to the text.

Figure 2:
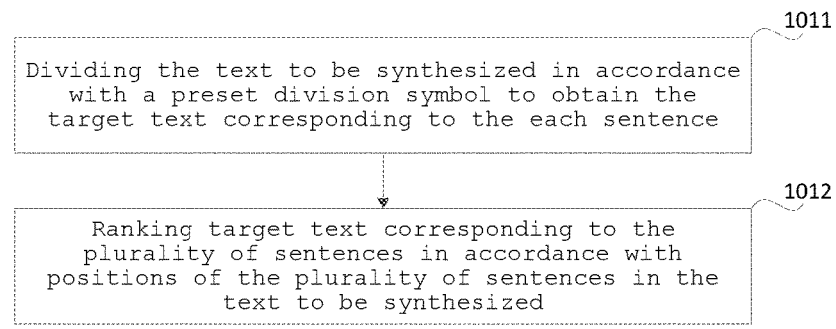
FIG. 2 is a flow diagram illustrating another speech synthesis method in accordance with an exemplary embodiment.

FIG. 2 is a flow diagram illustrating another speech synthesis method in accordance with an exemplary embodiment, and as shown in FIG. 2, the step 101 can comprise:

step 1011, dividing the text to be synthesized in accordance with a preset division symbol to obtain the target text corresponding to the each sentence in the plurality of sentences.

Step 1012, ranking target text corresponding to the plurality of sentences in accordance with positions of the plurality of sentences in the text to be synthesized.

In some embodiments, the text to be synthesized can be divided in accordance with the preset division symbol, so that the text to be synthesized is divided into the target text corresponding to the plurality of sentences. For example, starting from a first character of a first line of the text to be synthesized, a closest division symbol is searched for to obtain target text corresponding to a first sentence. And then, starting from a first character following the target text corresponding to the first sentence, it is continued to search for the closest division symbol downwards to obtain target text corresponding to the second sentence, and so on. The division symbol can be, for example, a full stop, a quotation mark, a carriage return, a line break, etc., which is not specifically limited in this disclosure. After the target text corresponding to the plurality of sentences is obtained, the target text corresponding to the plurality of sentences can be ranked in accordance with the position of the target text corresponding to each sentence in the text to be synthesized, and the sequence of the target text corresponding to the plurality of sentences corresponds to the positions thereof in the text to be synthesized.

In some embodiments, for each sentence, the target audio corresponding to the sentence can be obtained by the speech synthesis model in accordance with the following operations:

first, obtaining, based on the target text corresponding to the sentence, a text feature corresponding to the target text corresponding to the sentence.

Then, obtaining, based on the historical text corresponding to the sentence, a historical text feature corresponding to the historical text, and obtaining, based on the historical audio corresponding to the sentence, a historical audio feature corresponding to the historical audio.

Then, obtaining, based on the text feature, the historical text feature, and the historical audio feature, a semantic feature corresponding to the target text corresponding to the sentence.

Finally, obtaining, based on the semantic feature corresponding to the target text corresponding to the sentence, the target audio corresponding to the sentence.

For example, in the specific process of synthesizing the target audio through the speech synthesis model, the text feature corresponding to the target text corresponding to the sentence can be extracted first, wherein the text feature can be understood as a text vector capable of characterizing the target text corresponding to the sentence. Then, the historical text feature corresponding to the historical text and the historical audio feature corresponding to the historical audio are extracted, wherein the historical text feature can be understood as a text vector capable of characterizing the historical text, and the historical audio feature can comprise features of multiple dimensions, which can comprise, for example: at least one of a volume feature, a style feature, an emotion feature, or an acoustic feature (including loudness, tone, and timbre), and can also comprise a rhythm feature, a speech rate feature, or the like.

Further, the text feature, the historical text feature, and the historical audio feature can be combined into the semantic feature corresponding to the target text corresponding to the sentence, so that the target audio is generated in accordance with the semantic feature. The semantic feature can be understood as a feature vector capable of characterizing the sentence.

Figure 3:
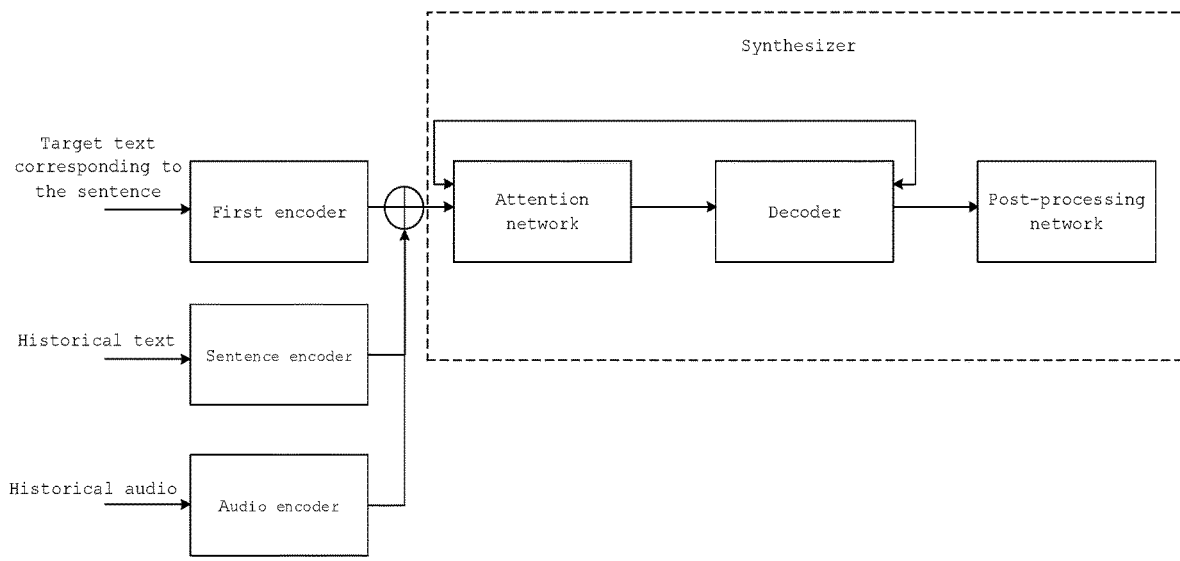
FIG. 3 is a block diagram illustrating a speech synthesis model in accordance with an exemplary embodiment.

FIG. 3 is a block diagram illustrating a speech synthesis model in accordance with an exemplary embodiment, and as shown in FIG. 3, the speech synthesis model can comprise: a first encoder, a sentence encoder, an audio encoder, and a synthesizer. A structure of the first encoder can be the same as that of an encoder (i.e., Encoder) in a Tacotron model. The synthesizer can be understood as a combination of an attention network (i.e., Attention), an decoder (i.e., Decoder), and a post-processing network (i.e., Post-processing) in the Tacotron model.

The sentence encoder can be understood as an extraction model for extracting the historical text feature corresponding to the historical text, which is used for characterizing the historical text. The audio encoder can also be understood as an extraction model for extracting the historical audio feature in the historical audio, which is used for characterizing the historical audio. The sentence encoder can be, for example, BERT (Bidirectional Encoder Representation from Transformers), and the audio encoder (which can be represented as a Wave Feature Extractor) can be, for example, a 3-layer, 256-unit, and 8-head Transformer.

Figure 4:
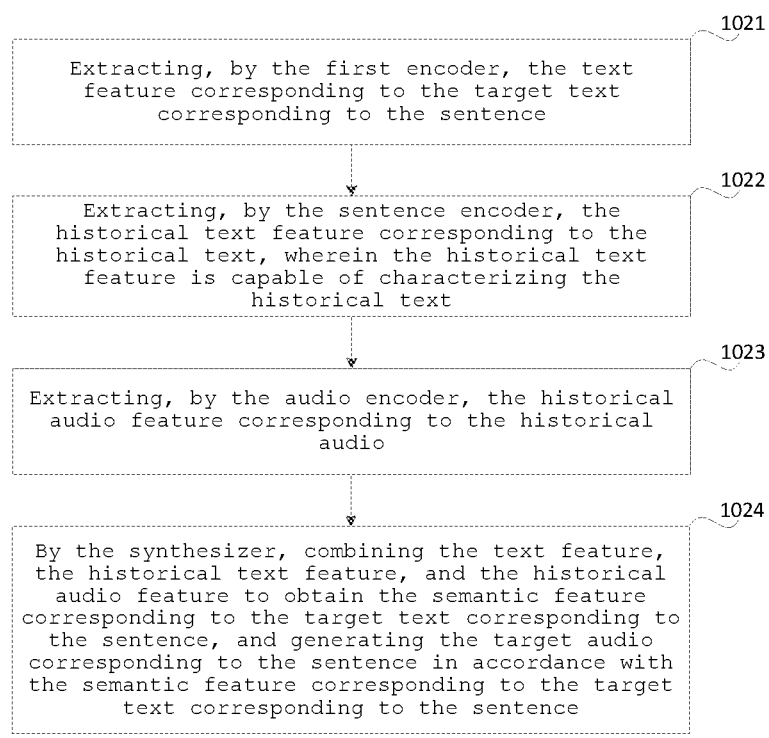
FIG. 4 is a flow diagram illustrating another speech synthesis method in accordance with an exemplary embodiment.

FIG. 4 is a flow diagram illustrating another speech synthesis method in accordance with an exemplary embodiment, and as shown in FIG. 4, the implementation of the step 102 can comprise:

step 1021, extracting, by the first encoder, the text feature corresponding to the target text corresponding to the sentence.

For example, the first encoder can comprise a Character Embedding layer, a Pre-net sub-model, and a CBHG (Convolution Bank+Highway network+bidirectional Gated Recurrent Unit) sub-model. The target text corresponding to the sentence is input into the first encoder, first, the target text is converted into a word vector by the Character Embedding layer, and then the word vector is input into the Pre-net sub-model to perform nonlinear transformation on the word vector, so as to improve convergence and generalization capabilities of the speech synthesis model, and finally, the text feature capable of characterizing the target text corresponding to the sentence is obtained by the CBHG sub-model in accordance with the word vector after the nonlinear transformation.

Step 1022, extracting, by the sentence encoder, the historical text feature corresponding to the historical text, wherein the historical text feature is capable of characterizing the historical text.

Step 1023, extracting, by the audio encoder, the historical audio feature corresponding to the historical audio, wherein the historical audio feature is capable of characterizing the historical audio and comprises at least one of a volume feature, a style feature, an emotion feature, or an acoustic feature.

Exemplarily, the historical text is input into the sentence encoder to acquire the historical text feature (which can be denoted as sentence_embedding) output by the sentence encoder. The historical audio is input to the audio encoder to acquire a historical audio vector (which can be denoted as wave_embedding) output by the audio encoder. It should be noted that, when the target text corresponding to the sentence is the target text corresponding to the first sentence in the text to be synthesized, the historical text feature can be set to zero, and the historical audio feature can also be set to zero.

Step 1024, by the synthesizer, combining the text feature, the historical text feature, and the historical audio feature to obtain the semantic feature corresponding to the target text corresponding to the sentence, and generating the target audio corresponding to the sentence in accordance with the semantic feature corresponding to the target text corresponding to the sentence.

Exemplarily, the synthesizer can comprise an attention network, a decoder, and a post-processing network. First, the text feature, the historical text feature, and the historical audio feature are combined (which can be understood as adding up a first sentence vector, a second sentence vector, and an audio vector) to obtain a combination vector. Then, the combination vector is input into the attention network, and the attention network can add an attention weight to each element in the combination vector, so that the combination vector with a fixed length is changed into a semantic feature with a variable length, wherein the semantic feature is capable of comprehensively characterizing the target text, the historical text, and the historical audio that correspond to the sentence. Specifically, the attention network can be a Locative Sensitive Attention network, or a GMM (Gaussian Mixture Model) attention network, or a Multi-Head Attention network, which is not limited in this disclosure.

Further, the semantic feature can be input to the Decoder, which can comprise a Pre-net sub-model (which can be the same as the Pre-net sub-model included in the first encoder), Attention-RNN (Recurrent Neural Network), and Decoder-RNN. The Pre-net sub-model is used for performing nonlinear transformation on the input semantic feature, and, a structure of the Attention-RNN is a one-layer unidirectional zoneout-based LSTM (Long Short-Term Memory), which is capable of taking the output of the Pre-net sub-model as an input, which is output to the Decoder-RNN after passing through the LSTM unit. The Decode-RNN is a two-layer unidirectional zoneout-based LSTM, through which Mel spectrum information is output, wherein the Mel spectrum information can comprise one or more Mel spectrum features. Finally, the Mel spectrum information is input to the post-processing network, which can comprise a vocoder (e.g., a Wavenet vocoder, Griffin-Lim vocoder, etc.) for converting the Mel spectrum feature information to obtain the target audio.

In some embodiments, the synthesizer can comprise the decoder, and the implementation of the corresponding step 1024 can comprise:

step 1) setting a hidden-layer state of the decoder as a historical state value which is a hidden-layer state of the decoder when the speech synthesis model outputs a last audio frame in the historical audio.

Step 2) inputting a first semantic element in the semantic feature into the decoder to acquire a Mel spectrum feature corresponding to the first semantic element which is output by the decoder, the semantic feature comprising a plurality of semantic elements.

Step 3) inputting each of the other semantic elements in the semantic feature into the decoder to acquire a Mel spectrum feature corresponding to the each of the other semantic elements which is output by the decoder, wherein the other semantic elements are the semantic elements other than the first semantic element in the semantic feature.

Step 4) generating the target audio corresponding to the sentence based on the Mel spectrum features corresponding to respective semantic elements in the semantic feature.

Generally, the speech synthesis is separately performed on the target text corresponding to the each sentence in the text, and then when the synthesized audio corresponding to respective sentences is spliced, a mute segment with a fixed length (for example, 500 ms) will be inserted among the synthesized audio of respective sentences, so that the splicing effect is stiff and unnatural, and the auditory experience of the user is reduced. For this case, when the semantic feature is input into the decoder, first, the hidden-layer state of the decoder can be set as the hidden-layer state (i.e. the historical state value) of the decoder when the speech synthesis model outputs the last audio frame in the historical audio. The hidden-layer state can be understood as a Decoder-RNN state, that is, the Decoder-RNN state corresponding to a first timestep of the target text corresponding to the sentence is set as the Decoder-RNN state corresponding to a last timestep of the historical text. Thereafter, the first semantic element (i.e., the first timestep of the target text corresponding to the sentence) in the semantic feature is input into the decoder, to acquire the Mel spectrum feature (which can be one Mel spectrum feature or multiple Mel spectrum features) corresponding to the first semantic element which is output by the decoder. And then, a second semantic element in the semantic feature is input into the decoder to acquire a Mel spectrum feature (which can be one Mel spectrum feature or multiple Mel spectrum features) corresponding to the second semantic element which is output by the decoder, and so on, until the Mel spectrum features corresponding to respective semantic elements are acquired, and finally the Mel spectrum features corresponding to respective semantic elements in the semantic feature are combined to obtain the Mel spectrum information. In this way, when the target audio corresponding to the each sentence is synthesized, the decoder can, based on the Decoder-RNN state of the historical text corresponding to the sentence, enable the speech synthesis model to predict the number of mute frames included in the target audio corresponding to the each sentence, so that a pause among the target audio corresponding to respective sentences in the total audio is more consistent and closer to the natural effect, which improves the splicing effect and the auditory experience of the user.

Figure 5:
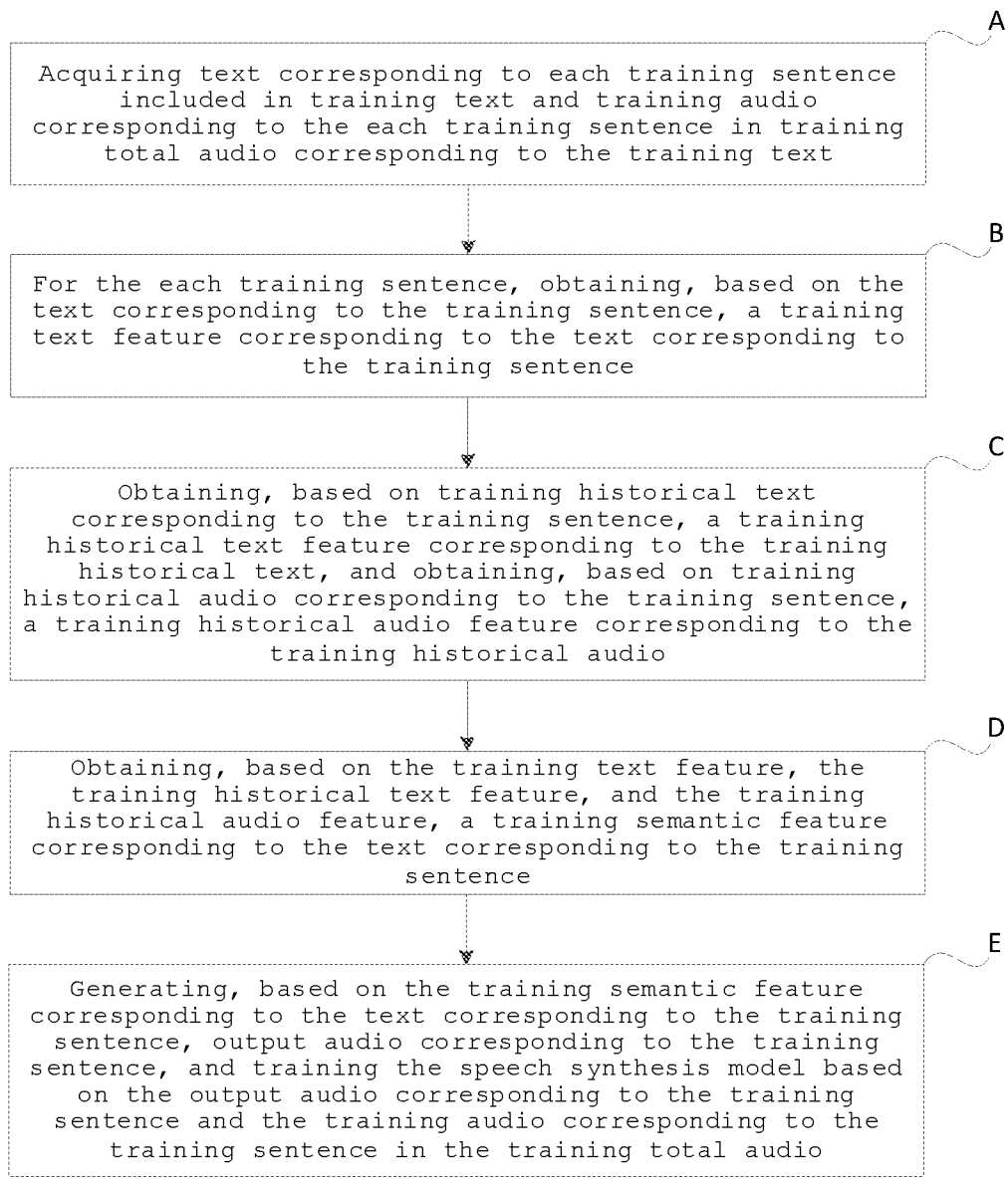
FIG. 5 is a flow diagram illustrating training the speech synthesis model in accordance with an exemplary embodiment.

FIG. 5 is a flowchart illustrating a process of training a speech synthesis model in accordance with an exemplary embodiment. The process of training the speech synthesis model can be included in the speech synthesis method in accordance with the present disclosure, or can be excluded from the speech synthesis method in accordance with the present disclosure but applicable to the speech synthesis method in accordance with the present disclosure. As shown in FIG. 5, the speech synthesis model in the above embodiment is obtained by training as follows:

step A, acquiring text corresponding to each training sentence included in training text and training audio corresponding to the each training sentence in training total audio corresponding to the training text.

Step B, for the each training sentence, obtaining, based on the text corresponding to the training sentence, a training text feature corresponding to the text corresponding to the training sentence.

Step C, obtaining, based on training historical text corresponding to the training sentence, a training historical text feature corresponding to the training historical text, and obtaining, based on training historical audio corresponding to the training sentence, a training historical audio feature corresponding to the training historical audio, wherein the training historical text is text corresponding to an associated sentence (for example, a previous sentence) of the training sentence in the training text, and the training historical audio is output audio corresponding to the training historical text.

Step D, obtaining, based on the training text feature, the training historical text feature, and the training historical audio feature, a training semantic feature corresponding to the text corresponding to the training sentence.

Step E, generating, based on the training semantic feature corresponding to the text corresponding to the training sentence, output audio corresponding to the training sentence, and training the speech synthesis model based on the output audio corresponding to the training sentence and the training audio corresponding to the training sentence in the training total audio.

For example, training a speech synthesis model requires first acquiring training text and training total audio corresponding to the training text. For example, a large amount of text can be captured on the Internet as training text, and then audio corresponding to the training text is used as training total audio. The training text comprises text corresponding to a plurality of training sentences, and the training total audio can be divided into training audio corresponding to each training sentence.

Specifically, the speech synthesis model can comprise: a first encoder, a sentence encoder, an audio encoder, and a synthesizer, and specific steps of training the speech synthesis model can comprise:

first, for each training sentence in the training text, inputting the text corresponding to the training sentence into the first encoder to acquire a training text feature corresponding to the text corresponding to the training sentence and output by the first encoder. Thereafter, inputting the training historical text into the sentence encoder to obtain the training historical text feature output by the sentence encoder, and inputting the training historical audio into the audio coder to obtain the training historical audio feature output by the audio coder. And then, combining the training text feature, the training historical text feature, and the training historical audio feature to obtain a training combination vector, and inputting the training combination vector into the attention network to acquire the training semantic feature corresponding to the text corresponding to the training sentence which is output by the attention. And finally, inputting the training semantic feature into the decoder to acquire training Mel spectrum information output by the decoder, and inputting the training Mel spectrum information into the post-processing network, the output of which is the output audio output by the speech synthesis model.

The training audio corresponding to the training sentence in the training total audio corresponding to the training text is compared with the output audio, so as to adjust a weight and a bias of a neuron in the speech synthesis model. And it is determined that the training is completed when the speech synthesis model satisfies a predetermined condition (e.g., a predetermined loss function is minimized).

In some embodiments, the loss function of the speech synthesis model can be determined by a first loss and a second loss. The first loss is determined by the output audio corresponding to the training sentence and the training audio corresponding to the training sentence in the training total audio, and the second loss is determined by the training historical audio feature and the training audio corresponding to the training historical text in the training total audio.

Exemplarily, the loss function can be jointly determined by the first loss and the second loss, for example, can be a weighted sum of the first loss and the second loss. The first loss can be understood to be a loss function determined by a difference (which can also be a mean square error) between the output audio corresponding to the training sentence and the training audio corresponding to the training sentence in the training total audio. The second loss can be understood as a loss function determined by a difference (which can also be a mean square error) between the training historical audio feature and a training audio feature corresponding to the training audio corresponding to the training historical text in the training total audio, wherein the training audio feature is obtained by processing, by using signal processing, labeling, or the like, the training audio corresponding to the training historical text in the training total audio. The weights for the weighted sum can be set in various appropriate manners, for example, can be set in consideration of the characters of the historical audio, so that in the process of training the speech synthesis model, the weight and the bias of the neuron in the speech synthesis model can be adjusted as a whole, and the weight and the bias of the neuron in the audio encoder can also be adjusted, thereby ensuring the accuracy and effectiveness of the speech synthesis model and the audio encoder.

In summary, in the present disclosure, first, the plurality of sentences included in the text to be synthesized are acquired; and then, for the target text corresponding to the each sentence, the target text corresponding to the sentence and the historical text and historical audio corresponding to the sentence are input together into the pre-trained speech synthesis model, and the output of the speech synthesis model is the target audio corresponding to the sentence, wherein the historical sentence is target text corresponding to the associated sentence (for example, a previous sentence) of the sentence in the text to be synthesized, and the historical audio is the target audio corresponding to the historical text; and finally, the target audio corresponding to respective sentences is synthesized to obtain the total audio corresponding to the text to be synthesized. In the present disclosure, when the speech synthesis is performed on the text including a plurality of sentences, for each sentence, the corresponding audio can be synthesized in combination with the information contained in the associated sentence of the sentence, so that audio corresponding to two adjacent sentences can be kept consistent, thereby improving the consistency of the total audio corresponding to the text.

Figure 6:
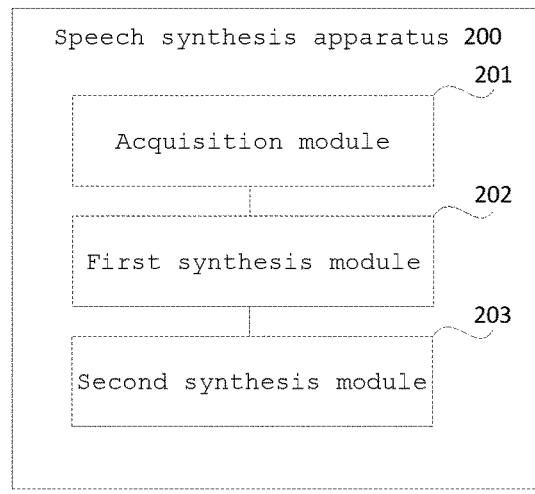
FIG. 6 is a block diagram illustrating a speech synthesis apparatus in accordance with an exemplary embodiment.

FIG. 6 is a block diagram illustrating a speech synthesis apparatus in accordance with an exemplary embodiment, and as shown in FIG. 6, the apparatus 200 comprises:

an acquisition module 201 configured to acquire target text corresponding to each sentence in a plurality of sentences included in text to be synthesized.

A first synthesis module 202 configured to, for the each sentence, input the target text corresponding to the sentence, historical text corresponding to the sentence, and historical audio corresponding to the sentence into a pre-trained speech synthesis model to acquire target audio corresponding to the sentence which is output by the speech synthesis model. The historical text can be text associated with the target text in the text to be synthesized, and in some embodiments, the historical text is target text corresponding to an associated sentence of the sentence in the text to be synthesized, specifically, the associated sentence is, for example, a previous sentence of the sentence in the text to be synthesized, and the historical audio is target audio corresponding to the historical text.

A second synthesis module 203 configured to synthesize the target audio corresponding to respective sentences to obtain total audio corresponding to the text to be synthesized.

Figure 7:
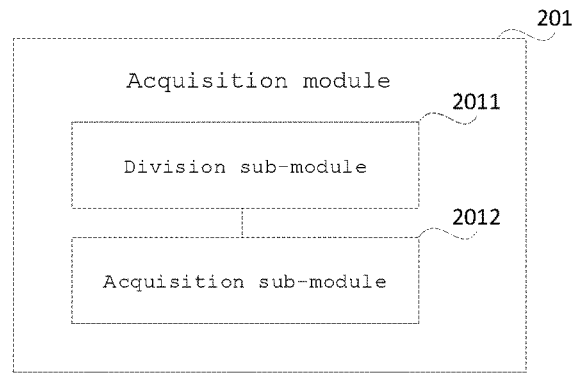
FIG. 7 is a block diagram illustrating another speech synthesis apparatus in accordance with an exemplary embodiment.

FIG. 7 is a block diagram illustrating another speech synthesis apparatus in accordance with an exemplary embodiment, and as shown in FIG. 7, the acquisition module 201 can comprise:

a division sub-module 2011 configured to divide the text to be synthesized in accordance with a preset division symbol to obtain the target text corresponding to the each sentence of the plurality of sentences.

An acquisition sub-module 2012 configured to rank the target text corresponding to the plurality of sentences in accordance with positions of the plurality of sentences in the text to be synthesized.

In some embodiments, the speech synthesis model can be configured to:

first, obtain, based on the target text corresponding to the sentence, a text feature corresponding to the target text corresponding to the sentence.

Then, obtain, based on the historical text corresponding to the sentence, a historical text feature corresponding to the historical text, and obtain, based on the historical audio corresponding to the sentence, a historical audio feature corresponding to the historical audio.

And then, obtain, based on the text feature, the historical text feature, and the historical audio feature, a semantic feature corresponding to the target text corresponding to the sentence.

And finally, obtain, based on the semantic feature corresponding to the target text corresponding to the sentence, the target audio corresponding to the sentence.

Figure 8:
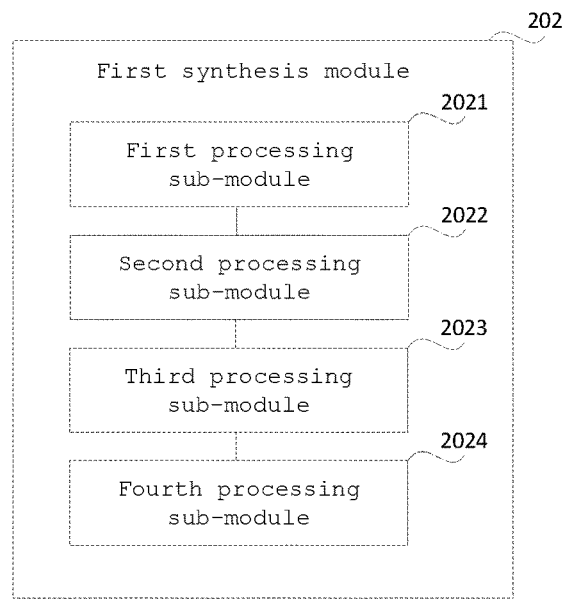
FIG. 8 is a block diagram illustrating another speech synthesis apparatus in accordance with an exemplary embodiment.

FIG. 8 is a block diagram of another speech synthesis apparatus in accordance with an exemplary embodiment, and as shown in FIG. 8, the speech synthesis model can comprise: a first encoder, a sentence encoder, an audio encoder, and a synthesizer. The first synthesis module 202 can comprise:

a first processing sub-module 2021 configured to extract, by the first encoder, the text feature corresponding to the target text corresponding to the sentence.

A second processing sub-module 2022 configured to extract, by the sentence encoder, the historical text feature corresponding to the historical text, wherein the historical text feature is capable of characterizing the historical text.

A third processing sub-module 2023 configured to extract, by the audio encoder, the historical audio feature corresponding to the historical audio, wherein the historical audio feature is capable of characterizing the historical audio and comprises at least one of a volume feature, a style feature, an emotion feature, or an acoustic feature.

A fourth processing sub-module 2024 configured to, by the synthesizer, combine the text feature, the historical text feature, and the historical audio feature, to obtain the semantic feature corresponding to the target text corresponding to the sentence, and generate the target audio corresponding to the sentence in accordance with the semantic feature corresponding to the target text corresponding to the sentence.

In another implementation scene, the fourth processing sub-module 2024 is configured to implement the following steps:

step 1) setting a hidden-layer state of the decoder as a historical state value which is a hidden-layer state of the decoder when the speech synthesis model outputs a last audio frame in the historical audio.

Step 2) inputting a first semantic element in the semantic feature into the decoder to acquire a Mel spectrum feature corresponding to the first semantic element which is output by the decoder, the semantic feature comprising a plurality of semantic elements.

Step 3) inputting each of the other semantic elements in the semantic feature into the decoder to acquire a Mel spectrum feature corresponding to the each of the other semantic elements which is output by the decoder, wherein the other semantic elements are the semantic elements other than the first semantic element in the semantic feature.

Step 4) generating the target audio corresponding to the sentence based on the Mel spectrum features corresponding to respective semantic elements in the semantic feature.

It should be noted that, the speech synthesis model in the above embodiment is obtained by training as follows:

step A, acquiring text corresponding to each training sentence included in training text and training audio corresponding to the each training sentence in training total audio corresponding to the training text.

Step B, for the each training sentence, obtaining, based on the text corresponding to the training sentence, a training text feature corresponding to the text corresponding to the training sentence.

Step C, obtaining, based on training historical text corresponding to the training sentence, a training historical text feature corresponding to the training historical text, and obtaining, based on training historical audio corresponding to the training sentence, a training historical audio feature corresponding to the training historical audio, wherein the training historical text is text corresponding to an associated sentence (for example, a previous sentence) of the training sentence in the training text, and the training historical audio is output audio corresponding to the training historical text.

Step D, obtaining, based on the training text feature, the training historical text feature, and the training historical audio feature, a training semantic feature corresponding to the text corresponding to the training sentence.

Step E, generating, based on the training semantic feature corresponding to the text corresponding to the training sentence, output audio corresponding to the training sentence, and training the speech synthesis model in accordance with the output audio corresponding to the training sentence and the training audio corresponding to the training sentence in the training total audio.

In some embodiments, a loss function of the speech synthesis model is determined by a first loss and a second loss. The first loss is determined by the output audio corresponding to the training sentence and the training audio corresponding to the training sentence in the training total audio, and the second loss is determined by the training historical audio feature and the training audio corresponding to the training historical text in the training total audio.

With regard to the apparatus in the above embodiments, the specific manners in which respective modules perform the operations have been described in detail in the embodiments related to the method, which will not be described in detail here. It should be noted that the division of the respective modules above does not limit the specific implementations, and the respective modules above can be implemented, for example, in software, hardware, or a combination of software and hardware. In actual implementations, the respective modules above can be implemented as independent physical entities, or can also be implemented by a single entity (for example, a processor (CPU or DSP, etc.), an integrated circuit, etc.). It should be noted that although the respective modules are illustrated as separate modules in the drawings, one or more of the modules can be combined into one module or split into multiple modules. Furthermore, the above stress word determination module and speech synthesis model determination module are shown in the drawings with dashed lines, which indicates that these modules do not have to be included in the speech synthesis apparatus, and they can be implemented outside the speech synthesis apparatus or by another device outside the speech synthesis apparatus and the speech synthesis apparatus is informed of the result. Alternatively, the above stress word determination module and speech synthesis model determination module are shown in the drawings with dashed lines, which indicates that these modules may not actually exist, but the operations/functions implemented by them can be implemented by the speech synthesis apparatus itself.

In summary, in the present disclosure, first, the target text corresponding to each sentence in the plurality of sentences included in the text to be synthesized is acquired, and then, for the each sentence, the target text corresponding to the sentence and the historical text and historical audio corresponding to the sentence are input together into the pre-trained speech synthesis model, and the output of the speech synthesis model is the target audio corresponding to the sentence, wherein the historical text is target text corresponding to the associated sentence (for example, a previous sentence) of the sentence in the text to be synthesized, and the historical audio is target audio corresponding to the historical text, and finally, the target audio corresponding to respective sentences is synthesized to obtain the total audio corresponding to the text to be synthesized. In the present disclosure, when the speech synthesis is performed on the text including a plurality of sentences, for each sentence, the corresponding audio can be synthesized in combination with the information contained in the associated sentence (for example, a previous sentence) of the sentence, so that audio corresponding to two adjacent sentences can be kept consistent, thereby improving the consistency of the total audio corresponding to the text.

Figure 9:
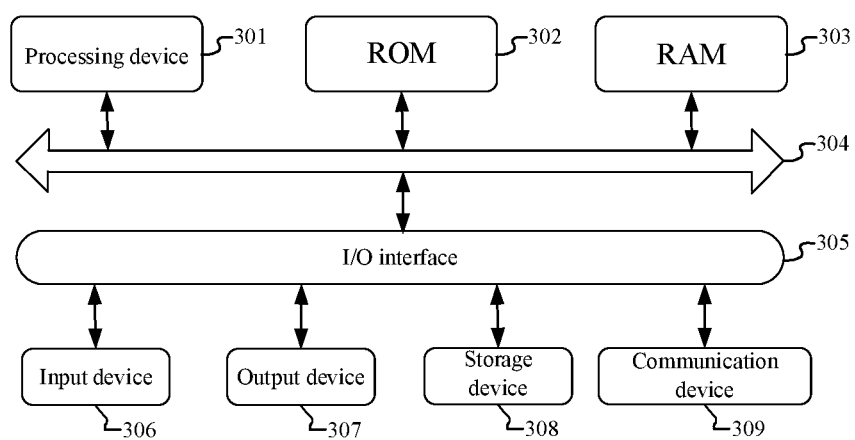
FIG. 9 is a block diagram illustrating an electronic device in accordance with an exemplary embodiment.

Reference is below made to FIG. 9, which is a schematic structural diagram of an electronic device (i.e., an execution body for the above speech synthesis method) 300 suitable for implementing an embodiment of the present disclosure. The electronic device in the embodiment of the present disclosure can include, but is not limited to, a mobile terminal such as a mobile phone, notebook computer, digital broadcast receiver, PDA (Personal Digital Assistant), PAD (tablet computer), PMP (Portable Multimedia Player), vehicle-mounted terminal (e.g., vehicle-mounted navigation terminal), and the like, and a fixed terminal such as a digital TV, desktop computer, and the like. The electronic device shown in FIG. 9 is only an example, and should not bring any limitation to the functions and the use scopes of the embodiments of the present disclosure.

As shown in FIG. 9, the electronic device 300 can comprise a processing device (e.g., a central processing unit, a graphics processing unit, etc.) 301, which can perform various appropriate actions and processes in accordance with a program stored in a read-only memory (ROM) 302 or a program loaded from a storage device 308 into a random access memory (RAM) 303. In the RAM 303, various programs and data necessary for the operation of the electronic device 300 are also stored. The processing device 301, the ROM 302, and the RAM 303 are connected to each other via a bus 304. An input/output (I/O) interface 305 is also connected to the bus 304.

Generally, the following devices can be connected to the I/O interface 305: an input device 306 including, for example, a touch screen, touch pad, keyboard, mouse, camera, microphone, accelerometer, gyroscope, or the like; an output device 307 including, for example, a liquid crystal display (LCD), speaker, vibrator, or the like; the storage device 308 including, for example, a magnetic tape, hard disk, or the like; and a communication device 309. The communication device 309 can allow the electronic device 300 to be in wireless or wired communication with other devices to exchange data. While FIG. 9 illustrates the electronic device 300 having various devices, it should be understood that not all illustrated devices are required to be implemented or provided. More or fewer devices can be alternatively implemented or provided.

In particular, in accordance with the embodiment of the present disclosure, the process described above with reference to the flow diagram can be implemented as a computer software program. For example, an embodiment of the present disclosure comprises a computer program product comprising a computer program carried on a non-transitory computer-readable medium, the computer program containing program code for performing the methods illustrated by the flow diagrams. In such an embodiment, the computer program can be downloaded and installed from a network via the communication device 309, or installed from the storage device 308, or installed from the ROM 302. The computer program, when executed by the processing device 301, performs the above functions defined in the method of the embodiments of the present disclosure.

It should be noted that the above computer-readable medium of the present disclosure can be a computer-readable signal medium or a computer-readable storage medium or any combination of the two. The computer-readable storage medium can be, for example, but not limited to, an electronic, magnetic, optical, electromagnetic, infrared, or semiconductor system, apparatus, or device, or any combination of the above. More specific examples of the computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium containing or storing a program which can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take any of a variety of forms, including, but not limited to, an electromagnetic signal, an optical signal, or any suitable combination of the above. The computer-readable signal medium can be any computer-readable medium other than the computer-readable storage medium, and the computer-readable signal medium can send, propagate, or transmit a program for use by or in conjunction with an instruction execution system, apparatus, or device. Program code contained on the computer-readable medium can be transmitted using any appropriate medium, including but not limited to: an electrical wire, an optical cable, RF (radio frequency), etc., or any suitable combination of the above.

In some embodiments, the terminal device and the server can communicate using any currently known or future developed network protocol, such as HTTP (HyperText Transfer Protocol), and can be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium can be contained in the above electronic device; or can be separate and not assembled into the electronic device.

The above computer-readable medium has thereon carried one or more programs which, when executed by the electronic device, enable the electronic device to: acquire target text corresponding to each sentence in a plurality of sentences included in text to be synthesized; for the each sentence, input the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to an associated sentence (e.g., a previous sentence) of the sentence in the text to be synthesized, and the historical audio is target audio corresponding to the historical text; and synthesize target audio corresponding to respective sentences to obtain total audio corresponding to the text to be synthesized.

Computer program code for performing operations of the present disclosure can be written in one or more programming languages or a combination thereof, wherein the programming language includes but is not limited to an object-oriented programming language such as Java, Smalltalk, C++, and also includes a conventional procedural programming language, such as the "C" programming language or a similar programming language. The program code can be executed entirely on a user's computer, partly on the user's computer, as a stand-alone software package, partly on the user's computer and partly on a remote computer or entirely on the remote computer or server. In a scene where a remote computer is involved, the remote computer can be connected to the user's computer through any type of network, including a local area network (LAN) or a wide area network (WAN), or can be connected to an external computer (for example, through the Internet using an Internet service provider).

The flow diagrams and the block diagrams in the accompanying drawings illustrate the possibly implemented architectures, functions, and operations of the system, method and computer program product in accordance with various embodiments of the present disclosure. In this regard, each block in the flow diagram or block diagram can represent one module, segment, or portion of code, which contains one or more executable instructions for implementing the specified logical function. It should also be noted that, in some alternative implementations, functions annotated in the blocks can occur in a different order form that annotated in the drawings. For example, two blocks shown in succession can, in fact, be executed substantially in parallel, or they can sometimes be executed in a reverse order, which depends upon functions involved. It will also be noted that each block in the block diagrams and/or flow diagrams, and a combination of blocks in the block diagrams and/or flow diagrams, can be implemented with a special-purpose hardware-based system that performs the specified function or operation, or with a combination of special-purpose hardware and computer instructions.

The involved modules described in the embodiment of the present disclosure can be implemented by software or hardware. The name of the module does not constitute a limitation on the module itself under a certain circumstance, for example, the acquisition module can also be described as a "module that acquires the target text".

The functions described above herein can be performed, at least in part, by one or more hardware logic components. For example, without limitation, an exemplary type of hardware logic component that can be used includes: a field programmable gate array (FPGA), application specific integrated circuit (ASIC), application specific standard product (ASSP), system-on-a-chip (SOC), complex programmable logic device (CPLD), and the like.

In the context of this disclosure, a machine-readable medium can be a tangible medium, which can contain or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium can include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

In accordance with one or more embodiments of the present disclosure, an exemplary embodiment 1 provides a speech synthesis method, comprising: acquiring target text corresponding to each sentence in a plurality of sentences included in text to be synthesized; for the each sentence, inputting the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to an associated sentence (e.g., a previous sentence) of the sentence in the text to be synthesized, and the historical audio is target audio corresponding to the historical text; and synthesizing target audio corresponding to respective sentences to obtain total audio corresponding to the text to be synthesized.

In accordance with one or more embodiments of the present disclosure, an exemplary embodiment 2 provides the method of the exemplary embodiment 1, wherein the acquiring target text corresponding to each sentence in a plurality of sentences included in text to be synthesized comprises: dividing the text to be synthesized in accordance with a preset division symbol to obtain the target text corresponding to the each sentence; and ranking target text corresponding to the plurality of sentences in accordance with positions of the plurality of sentences in the text to be synthesized.

In accordance with one or more embodiments of the present disclosure, an exemplary embodiment 3 provides the method of the exemplary embodiment 1 or the exemplary embodiment 2, wherein the speech synthesis model is configured to: obtain, based on the target text corresponding to the sentence, a text feature corresponding to the target text corresponding to the sentence; obtain, based on the historical text corresponding to the sentence, a historical text feature corresponding to the historical text, and obtain, based on the historical audio corresponding to the sentence, a historical audio feature corresponding to the historical audio; obtain, based on the text feature, the historical text feature, and the historical audio feature, a semantic feature corresponding to the target text corresponding to the sentence; and obtain, based on the semantic feature corresponding to the target text corresponding to the sentence, the target audio corresponding to the sentence.

In accordance with one or more embodiments of the present disclosure, an exemplary embodiment 4 provides the method of the exemplary embodiment 3, wherein the speech synthesis model comprises: a first encoder, a sentence encoder, an audio encoder, and a synthesizer; and the inputting the target text corresponding to the sentence, historical text corresponding to the sentence, and historical audio corresponding to the sentence into a pre-trained speech synthesis model to acquire target audio corresponding to the sentence which is output by the speech synthesis model comprises: extracting, by the first encoder, the text feature corresponding to the target text corresponding to the sentence; extracting, by the sentence encoder, the historical text feature corresponding to the historical text, wherein the historical text feature is capable of characterizing the historical text; extracting, by the audio encoder, the historical audio feature corresponding to the historical audio, wherein the historical audio feature is capable of characterizing the historical audio and comprises at least one of a volume feature, a style feature, an emotion feature, or an acoustic feature; and by the synthesizer, combining the text feature, the historical text feature, and the historical audio feature to obtain the semantic feature corresponding to the target text corresponding to the sentence, and generating the target audio corresponding to the sentence based on the semantic feature corresponding to the target text corresponding to the sentence.

In accordance with one or more embodiments of the present disclosure, an exemplary embodiment 5 provides the method of the exemplary embodiment 4, wherein the synthesizer comprises a decoder, and the generating, by the synthesizer, the target audio corresponding to the sentence based on the semantic feature corresponding to the target text corresponding to the sentence comprises: setting a hidden-layer state of the decoder as a historical state value which is a hidden-layer state of the decoder when the speech synthesis model outputs a last audio frame in the historical audio; inputting a first semantic element in the semantic feature into the decoder to acquire a Mel spectrum feature corresponding to the first semantic element which is output by the decoder, the semantic feature comprising a plurality of semantic elements; inputting each of the other semantic elements in the semantic feature into the decoder to acquire a Mel spectrum feature corresponding to the each of the other semantic elements which is output by the decoder, wherein the other semantic elements are the semantic elements other than the first semantic element in the semantic feature; and generating the target audio corresponding to the sentence based on the Mel spectrum features corresponding to respective semantic elements in the semantic feature.

In accordance with one or more embodiments of the present disclosure, an exemplary embodiment 6 provides the method of the exemplary embodiment 3, wherein the speech synthesis model is obtained by training as follows: acquiring text corresponding to each training sentence included in training text and training audio corresponding to the each training sentence in training total audio corresponding to the training text; for the each training sentence, obtaining, based on the text corresponding to the training sentence, a training text feature corresponding to the text corresponding to the training sentence; obtaining, based on training historical text corresponding to the training sentence, a training historical text feature corresponding to the training historical text, and obtaining, based on training historical audio corresponding to the training sentence, a training historical audio feature corresponding to the training historical audio, wherein the training historical text is text corresponding to an associated sentence (e.g., a previous sentence) of the training sentence in the training text, and the training historical audio is output audio corresponding to the training historical text; obtaining, based on the training text feature, the training historical text feature, and the training historical audio feature, a training semantic feature corresponding to the text corresponding to the training sentence; and generating, based on the training semantic feature corresponding to the text corresponding to the training sentence, output audio corresponding to the training sentence, and training the speech synthesis model based on the output audio corresponding to the training sentence and the training audio corresponding to the training sentence in the training total audio.

In accordance with one or more embodiments of the present disclosure, an exemplary embodiment 7 provides the method of the exemplary embodiment 6, wherein a loss function of the speech synthesis model is determined by a first loss and a second loss, the first loss is determined by the output audio corresponding to the training sentence and the training audio corresponding to the training sentence in the training total audio, and the second loss is determined by the training historical audio feature and the training audio corresponding to the training historical text in the training total audio.

In accordance with one or more embodiments of the present disclosure, an exemplary embodiment 8 provides a speech synthesis apparatus, comprising: an acquisition module configured to acquire target text corresponding to each sentence in a plurality of sentences included in text to be synthesized; a first synthesis module configured to, for the each sentence, input the target text corresponding to the sentence, historical text corresponding to the sentence, and historical audio corresponding to the sentence into a pre-trained speech synthesis model to acquire target audio corresponding to the sentence which is output by the speech synthesis model, wherein the historical text is target text corresponding to an associated sentence (e.g., a previous sentence) of the sentence in the text to be synthesized, and the historical audio is target audio corresponding to the historical text; and a second synthesis module configured to synthesize target audio corresponding to respective sentences to obtain total audio corresponding to the text to be synthesized.

In accordance with one or more embodiments of the present disclosure, an exemplary embodiment 9 provides a computer-readable medium having thereon stored a computer program which, when executed by a processing device, implements the steps of the method according to the exemplary embodiments 1 to 7.

In accordance with one or more embodiments of the present disclosure, an exemplary embodiment 10 provides an electronic device, comprising: a storage device having thereon stored a computer program; and a processing device for executing the computer program in the storage device to implement the steps of the method according to the exemplary embodiments 1 to 7.

The above description is only preferred embodiments of the present disclosure and an explanation of applied technical principles. It should be appreciated by those skilled in the art that the disclosure scope involved in this disclosure is not limited to a technical solution formed by a specific combination of the above technical features, but also covers other technical solutions formed by an arbitrary combination of the above technical features or their equivalent features without departing from the above disclosure concept, for example, a technical solution formed by replacing the above features with technical features having functions similar to (but not limited to) those disclosed in the present disclosure.

Furthermore, while operations are depicted in a specific order, this should not be understood as requiring that such operations be performed in the specific order shown or in a sequential order. Under certain circumstances, multitasking and parallel processing may be advantageous. Similarly, while several specific implementation details are included in the above discussion, these should not be construed as limitations on the scope of the present disclosure. Certain features that are described in the context of separate embodiments can also be implemented in a single embodiment in combination. Conversely, various features that are described in the context of a single embodiment can also be implemented in multiple embodiments separately or in any suitable sub-combination.

Although the subject matter has been described in terms specific to structural features and/or method logic actions, it should be understood that the subject matter defined in the attached claims is not necessarily limited to the specific features or actions described above. Conversely, the specific features and actions described above are only example forms of implementing the claims. With regard to the apparatus in the above embodiment, the specific manners in which respective module perform the operations have been described in detail in the embodiments related to the method, which will not be described in detail here.

What is claimed is:

1. A speech synthesis method, comprising:
   acquiring target text corresponding to each sentence in a plurality of sentences included in text to be synthesized;
   for each sentence, inputting the target text corresponding to the sentence, historical text, and historical audio into a pre-trained speech synthesis model to acquire target audio corresponding to the sentence which is output by the speech synthesis model, wherein the historical text is target text corresponding to an associated sentence of each sentence in the text to be synthesized, and the historical audio is target audio corresponding to the historical text; and
   synthesizing target audio corresponding to respective sentences to obtain total audio corresponding to the text to be synthesized,
   wherein the speech synthesis model is configured to:
   obtain, based on the target text corresponding to the sentence, a text feature corresponding to the target text corresponding to the sentence,
   obtain, based on the historical text, a historical text feature corresponding to the historical text, and obtain, based on the historical audio, a historical audio feature corresponding to the historical audio, obtain, based on the text feature, the historical text feature, and the historical audio feature, a semantic feature corresponding to the target text corresponding to the sentence, and obtain, based on the semantic feature corresponding to the target text corresponding to the sentence, the target audio corresponding to the sentence.

2. The method according to claim 1, wherein the acquiring target text corresponding to each sentence comprises:

dividing the text to be synthesized in accordance with a preset division symbol to obtain the target text corresponding to each sentence; and ranking target text corresponding to the plurality of sentences in accordance with positions of the plurality of sentences in the text to be synthesized.

3. The method according to claim 1, wherein the speech synthesis model comprises a first encoder, a sentence encoder, an audio encoder, and a synthesizer; and wherein the method comprises:

extracting, by the first encoder, the text feature corresponding to the target text corresponding to the sentence;

extracting, by the sentence encoder, the historical text feature corresponding to the historical text;

extracting, by the audio encoder, the historical audio feature corresponding to the historical audio; and by the synthesizer, combining the text feature, the historical text feature, and the historical audio feature to obtain the semantic feature corresponding to the target text corresponding to the sentence, and generating the target audio corresponding to the sentence based on the semantic feature corresponding to the target text corresponding to the sentence.

4. The method according to claim 3, wherein the synthesizer comprises a decoder, and the generating, by the synthesizer, the target audio corresponding to the sentence based on the semantic feature corresponding to the target text corresponding to the sentence comprises:

setting a hidden-layer state of the decoder as a historical state value which is a hidden-layer state of the decoder when the speech synthesis model outputs a last audio frame in the historical audio;

inputting a first semantic element in the semantic feature into the decoder to acquire a Mel spectrum feature corresponding to the first semantic element which is output by the decoder, the semantic feature comprising a plurality of semantic elements;

inputting each of the other semantic elements in the semantic feature into the decoder to acquire a Mel spectrum feature corresponding to the each of the other semantic elements which is output by the decoder, wherein the other semantic elements are the semantic elements other than the first semantic element in the semantic feature; and generating the target audio corresponding to the sentence based on the Mel spectrum features corresponding to respective semantic elements in the semantic feature.

5. The method according to claim 1, wherein the historical text feature is capable of characterizing the historical text, and the historical audio feature is capable of characterizing the historical audio and comprises at least one of a volume feature, a style feature, an emotion feature, or an acoustic feature.

6. The method according to claim 1, wherein the speech synthesis model is obtained by training as follows:

acquiring text corresponding to each training sentence included in training text and training audio corresponding to the each training sentence in training total audio corresponding to the training text;

for the each training sentence, obtaining, based on the text corresponding to the training sentence, a training text feature corresponding to the text corresponding to the training sentence;

obtaining, based on training historical text corresponding to the training sentence, a training historical text feature corresponding to the training historical text, and obtaining, based on training historical audio corresponding to the training sentence, a training historical audio feature corresponding to the training historical audio, wherein the training historical text is text corresponding to an associated sentence of the training sentence in the training text, and the training historical audio is output audio corresponding to the training historical text;

obtaining, based on the training text feature, the training historical text feature, and the training historical audio feature, a training semantic feature corresponding to the text corresponding to the training sentence; and generating, based on the training semantic feature corresponding to the text corresponding to the training sentence, output audio corresponding to the training sentence, and training the speech synthesis model based on the output audio corresponding to the training sentence and the training audio corresponding to the training sentence in the training total audio.

7. The method according to claim 6, wherein a loss function of the speech synthesis model is determined by a first loss and a second loss, the first loss is determined by the output audio corresponding to the training sentence and the training audio corresponding to the training sentence in the training total audio, and the second loss is determined by the training historical audio feature and a training audio feature which corresponds to the training audio corresponding to the training historical text in the training total audio.

8. The method according to claim 7, wherein the loss function of the speech synthesis model is determined by a weighted sum of the first loss and the second loss.

9. The method according to claim 1, wherein the historical text is target text corresponding to a previous sentence of the sentence in the text to be synthesized.

10. A non-transitory computer-readable storage medium having thereon stored a computer program which, when executed by a processing device, implements operations comprising:

acquiring target text corresponding to each sentence in a plurality of sentences included in text to be synthesized;

for each sentence, inputting the target text corresponding to the sentence, historical text, and historical audio into a pre-trained speech synthesis model to acquire target audio corresponding to the sentence which is output by the speech synthesis model, wherein the historical text is target text corresponding to an associated sentence of each sentence in the text to be synthesized, and the historical audio is target audio corresponding to the historical text; and synthesizing target audio corresponding to respective sentences to obtain total audio corresponding to the text to be synthesized, wherein the speech synthesis model is configured to:

obtain, based on the target text corresponding to the sentence, a text feature corresponding to the target text corresponding to the sentence, obtain, based on the historical text, a historical text feature corresponding to the historical text, and obtain, based on the historical audio, a historical audio feature corresponding to the historical audio, obtain, based on the text feature, the historical text feature, and the historical audio feature, a semantic feature corresponding to the target text corresponding to the sentence, and obtain, based on the semantic feature corresponding to the target text corresponding to the sentence, the target audio corresponding to the sentence.

11. The non-transitory computer-readable storage medium according to claim 10, wherein the acquiring target text corresponding to each sentence comprises:

dividing the text to be synthesized in accordance with a preset division symbol to obtain the target text corresponding to each sentence; and ranking target texts corresponding to the plurality of sentences in accordance with positions of the plurality of sentences in the text to be synthesized.

12. The non-transitory computer-readable storage medium according to claim 10, wherein the speech synthesis model comprises a first encoder, a sentence encoder, an audio encoder, and a synthesizer, and wherein the operations further comprise:

extracting, by the first encoder, the text feature corresponding to the target text corresponding to the sentence;

extracting, by the sentence encoder, the historical text feature corresponding to the historical text;

extracting, by the audio encoder, the historical audio feature corresponding to the historical audio; and by the synthesizer, combining the text feature, the historical text feature, and the historical audio feature to obtain the semantic feature corresponding to the target text corresponding to the sentence, and generating the target audio corresponding to the sentence based on the semantic feature corresponding to the target text corresponding to the sentence.

13. An electronic device, comprising: a storage device having thereon stored a computer program; and a processing device configured to execute the computer program in the storage device to implement operations comprising:

acquiring target text corresponding to each sentence in a plurality of sentences included in text to be synthesized;

for the each sentence, inputting the target text corresponding to the sentence, historical text, and historical audio into a pre-trained speech synthesis model to acquire target audio corresponding to the sentence which is output by the speech synthesis model, wherein the historical text is target text corresponding to an associated sentence of each sentence in the text to be synthesized, and the historical audio is target audio corresponding to the historical text; and synthesizing target audio corresponding to respective sentences to obtain total audio corresponding to the text to be synthesized, wherein the speech synthesis model is configured to:

obtain, based on the target text corresponding to the sentence, a text feature corresponding to the target text corresponding to the sentence, obtain, based on the historical text, a historical text feature corresponding to the historical text, and obtain, based on the historical audio, a historical audio feature corresponding to the historical audio, obtain, based on the text feature, the historical text feature, and the historical audio feature, a semantic feature corresponding to the target text corresponding to the sentence, and obtain, based on the semantic feature corresponding to the target text corresponding to the sentence, the target audio corresponding to the sentence.

14. The electronic device according to claim 13, wherein the acquiring target text corresponding to each sentence comprises:

dividing the text to be synthesized in accordance with a preset division symbol to obtain the target text corresponding to each sentence; and ranking target text corresponding to the plurality of sentences in accordance with positions of the plurality of sentences in the text to be synthesized.

15. The electronic device according to claim 13, wherein the speech synthesis model comprises a first encoder, a sentence encoder, an audio encoder, and a synthesizer; and wherein the operations comprise:

extracting, by the first encoder, the text feature corresponding to the target text corresponding to the sentence;

extracting, by the sentence encoder, the historical text feature corresponding to the historical text;

extracting, by the audio encoder, the historical audio feature corresponding to the historical audio; and by the synthesizer, combining the text feature, the historical text feature, and the historical audio feature to obtain the semantic feature corresponding to the target text corresponding to the sentence, and generating the target audio corresponding to the sentence based on the semantic feature corresponding to the target text corresponding to the sentence.

16. The electronic device according to claim 15, wherein the synthesizer comprises a decoder, and the generating, by the synthesizer, the target audio corresponding to the sentence based on the semantic feature corresponding to the target text corresponding to the sentence comprises:

setting a hidden-layer state of the decoder as a historical state value which is a hidden-layer state of the decoder when the speech synthesis model outputs a last audio frame in the historical audio;

inputting a first semantic element in the semantic feature into the decoder to acquire a Mel spectrum feature corresponding to the first semantic element which is output by the decoder, the semantic feature comprising a plurality of semantic elements;

inputting each of the other semantic elements in the semantic feature into the decoder to acquire a Mel spectrum feature corresponding to the each of the other semantic elements which is output by the decoder, wherein the other semantic elements are the semantic elements other than the first semantic element in the semantic feature; and generating the target audio corresponding to the sentence based on the Mel spectrum features corresponding to respective semantic elements in the semantic feature.

17. The electronic device according to claim 13, wherein the historical text feature is capable of characterizing the historical text, and the historical audio feature is capable of characterizing the historical audio and comprises at least one of a volume feature, a style feature, an emotion feature, or an acoustic feature.

18. The electronic device according to claim 13, wherein the speech synthesis model is obtained by training as follows:

acquiring text corresponding to each training sentence included in training text and training audio corresponding to the each training sentence in training total audio corresponding to the training text;

for the each training sentence, obtaining, based on the text corresponding to the training sentence, a training text feature corresponding to the text corresponding to the training sentence;

obtaining, based on training historical text corresponding to the training sentence, a training historical text feature corresponding to the training historical text, and obtaining, based on training historical audio corresponding to the training sentence, a training historical audio feature corresponding to the training historical audio, wherein the training historical text is text corresponding to an associated sentence of the training sentence in the training text, and the training historical audio is output audio corresponding to the training historical text;

obtaining, based on the training text feature, the training historical text feature, and the training historical audio feature, a training semantic feature corresponding to the text corresponding to the training sentence; and generating, based on the training semantic feature corresponding to the text corresponding to the training sentence, output audio corresponding to the training sentence, and training the speech synthesis model based on the output audio corresponding to the training sentence and the training audio corresponding to the training sentence in the training total audio.

19. The electronic device according to claim 18, wherein a loss function of the speech synthesis model is determined by a first loss and a second loss, the first loss is determined by the output audio corresponding to the training sentence and the training audio corresponding to the training sentence in the training total audio, and the second loss is determined by the training historical audio feature and a training audio feature which corresponds to the training audio corresponding to the training historical text in the training total audio.

20. The electronic device according to claim 19, wherein the loss function of the speech synthesis model is determined by a weighted sum of the first loss and the second loss.

* * * * *